UNITED STATES PATENT OFFICE.

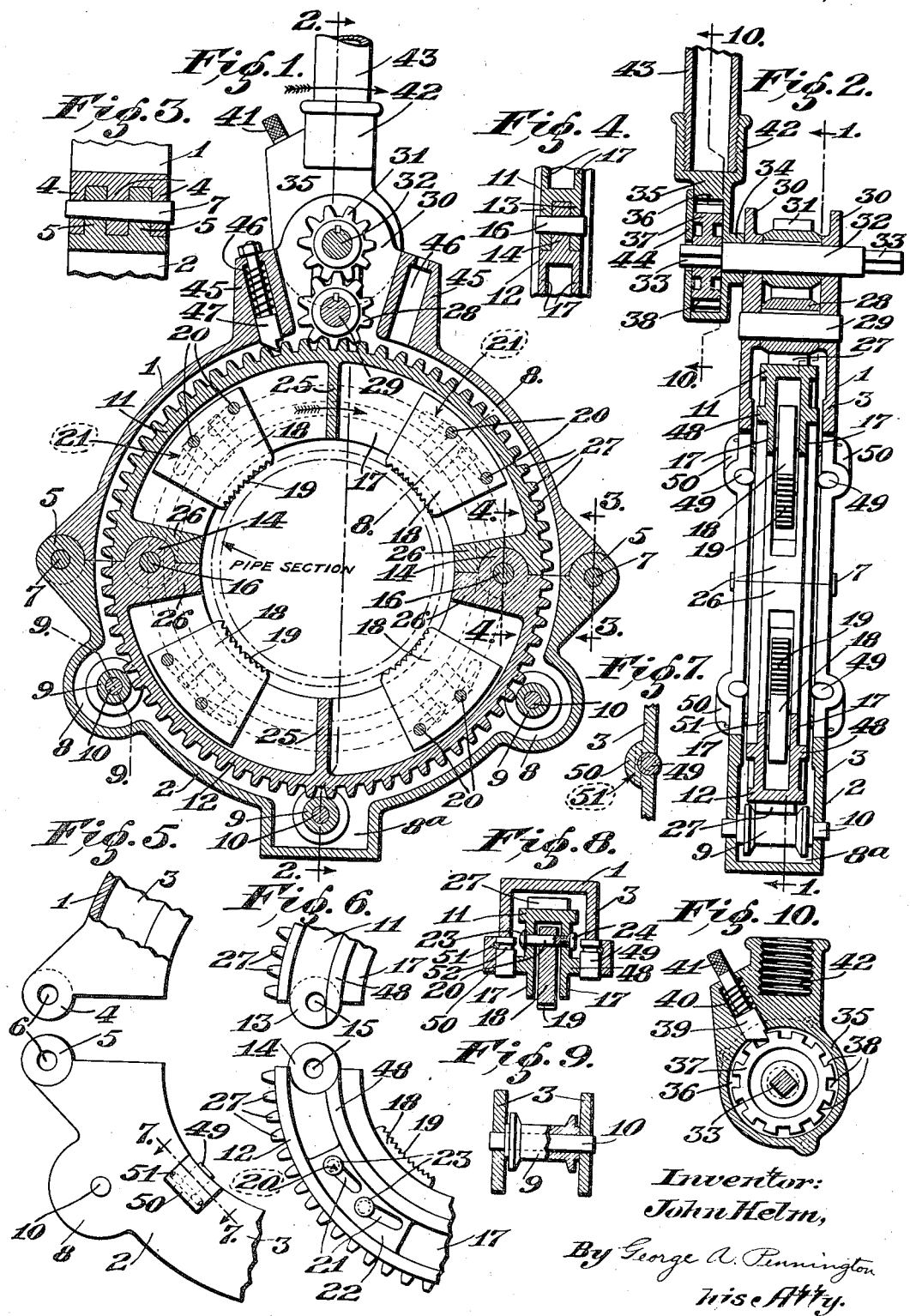

JOHN HELM, OF ST. LOUIS, MISSOURI.

PIPE-WRENCH.

1,200,612.  Specification of Letters Patent.  Patented Oct. 10, 1916.

Application filed March 17, 1916. Serial No. 84,784.

*To all whom it may concern:*

Be it known that I, JOHN HELM, a citizen of the United States, residing at the city of St. Louis, State of Missouri, have invented new and useful Improvements in Pipe-Wrenches, of which the following is a specification.

This invention relates to pipe wrenches.

It has for its principal objects to produce a device of this character which is particularly adapted for heavy pipe-fitting service, such as in gas, oil, steam and water pipe lines or other like supply mains; to produce a structure which may be conveniently used in the trenches; to produce a simple and efficient device so constructed and arranged that a powerful leverage is obtained and requiring but little physical force to operate the same; and to attain certain advantages which will hereinafter more fully appear.

The invention consists in the parts and in the combinations and arrangements of parts hereinafter described and claimed In the accompanying drawings illustrating a practical embodiment of the invention,—Figure 1 is a vertical section of the device, the section being taken on or about the line 1—1 of Fig. 2; Fig. 2 is a section on the line 2—2 of Fig. 1; Fig. 3 is a fragmentary section on the line 3—3 of Fig. 1, illustrating the joint at the meeting ends of the outer casing members; Fig. 4 is a fragmentary section on the line 4—4 of Fig. 1, illustrating the joint at the meeting ends of the chuck-ring members; Fig. 5 is a fragmentary side view showing the arrangement of the meeting end portions of the outer casing members; Fig. 6 is a fragmentary side view showing the arrangement of the meeting end portions of the chuck-ring members; Fig. 7 is a section on the line 7—7 of Fig. 5; Fig. 8 is a cross section of one of the chuck-ring and outer casing members, taken on or about the line 8—8 of Fig. 1; Fig. 9 is a section on the line 9—9 of Fig. 1; and Fig. 10 is a section on the line 10—10 of Fig. 2.

The device as illustrated in the drawings comprises an annular outer casing made in two separable half sections 1, 2, each of which is provided with side flanges 3. The meeting end portions of the two members 1, 2, are respectively provided with ears or extensions 4, 5, and counterpart recesses which interfit therewith, the respective ears or extensions being perforated, as at 6, to receive tapered pins 7 by which the members are secured together.

The member 2 of the outer casing is provided with two circular recessed portions 8 near its ends and a rectangular recessed portion 8ª at its middle in which are located flanged rollers 9 which are freely rotatable on shafts 10 mounted at their ends on the side flanges 3. These rollers 9 support a chuck-ring comprising two half sections 11, 12, whose meeting end portions are respectively provided with ears or extensions 13, 14, and counterpart recesses which interfit therewith, the respective ears or extensions being perforated, as at 15, to receive tapered pins 16 whereby they are separably connected in the same manner as the outer casing members.

The chuck-ring is provided with side flanges 17, between which, at four diametrically-opposite points, clutch-blocks 18 are mounted, said blocks having serrated, toothed or otherwise roughened portions 19 projecting beyond the edges of the flanges 17 so as to engage the pipe. These blocks 18 are apertured transversely to receive pins 20 whose end portions extend through inclined slots 21 provided in the flanges 17, said flanges 17 being preferably thickened in the region where the slots occur, as at 22 (see Fig. 6), and the pins having heads 23 at one end and being arranged at their opposite ends to receive headed retaining screws 24 (see Fig. 8). The flanges 17 are connected intermediate the ends of the members 11, 12 by cross webs or ribs 25 and at the ends by thickened webs 26 which serve to strengthen the structure.

On the periphery of the chuck-ring are gear teeth 27, and meshing with said teeth is a pinion 28 which is secured on a shaft 29 journaled at its ends in outward extensions 30 of the casing member 1. Outward with respect to and meshing with this pinion 28 is another pinion 31 which is secured on a shaft 32 journaled in the extensions 30 and extending outward beyond the latter and having its extreme end portions reduced and made square, as at 33.

Mounted to rotate freely on one of the projecting end portions of the shaft 32 is the hub portion 34 of a ratchet operating member 35, said member having a circular recess 36 to receive and house a ratchet wheel 37 which is secured tightly on the squared portion 33 of the shaft. The ratchet wheel is provided with peripheral recesses 38 for the engagement of a spring-pressed stud or pawl 39 working in a bore 40 provided therefor in the ratchet operating member 35, the end of the stud extending outside of the member 35, as at 41, and being knurled or otherwise arranged for convenience in withdrawing the stud from engagement with the ratchet wheel. The operating member 35 is provided with a socket portion 42 which is internally screw-threaded for the attachment of an operating handle or lever 43; and a cover plate 44 is provided over the recessed portion 36 to incase the ratchet wheel 37.

In using the device the chuck-ring is first applied to the pipe. This is accomplished by placing the previously separated sections around the pipe and bringing their ends together and fastening them with the pins 16. The clutch-blocks 18 are then made to engage the pipe, the inclined arrangement of the slots 21 being such that movement of the chuck-ring in one direction tends to make the blocks move inward so as to take a firm hold on the pipe. The sections of the outer casing are then placed around the chuck-ring, after which their end portions are secured together by the pins 7. When the parts are thus assembled the chuck-ring is supported on the rollers 9 and maintained in such relation by the pinion 28.

If the handle 43 is moved in the direction of the arrow, shown in Fig. 1, the pinion 31 is accordingly rotated owing to the engagement of the pawl 39 with the ratchet wheel 37 which is fixed to the shaft 32. The pinion 28 is in turn rotated in the reverse direction and the chuck-ring in the same direction as the pinion 31, and owing to the engagement of the clutch-blocks 18 with the pipe the latter moves with the chuck-ring.

In some cases, if necessary, the outer casing may be held against rotation in any desirable or convenient way, depending upon the place where or under what conditions the wrench is used. In the trench, blocks or struts may be readily placed between the side walls of the trench and the extensions 30 or the portion 8ª of the casing. Sometimes the weight of the pipe alone bearing on the casing upon the ground or some other support is sufficient to enable the wrench to operate successfully; and for some work it is not necessary to chock the casing at all.

As shown in the drawings, the extensions 30 of the outer casing are connected on opposite sides by cross webs 45 which are provided with radial bores 46 in either or both of which may be placed a spring-pressed ratchet bolt 47 having a beveled end portion to engage the peripheral teeth 27 of the chuck-ring. The arrangement and function of the bolt or bolts are such that normally the other casing and the chuck-ring are yieldably held against independent rotation, but are permitted to rotate independent of each other when force is applied to either. To avoid undue friction which might occur between the side flanges 17 of the chuck-ring and the side flanges 3 of the outer casing, said flanges 17 are provided on their outer faces with annular ribs 48 which bear against anti-friction rollers 49 whose peripheral portions project beyond the inner faces of the flanges 3. To afford bearing seats for the rollers 49 the flanges 3 have outwardly raised marginal portions 50 which are recessed cylindrically and the rollers are inserted endwise therein and there held against endwise displacement by tangential pins 51 which are inserted in apertures provided therefor in the raised portions 50 so as to engage annularly grooved portions 52 of the rollers.

While the device is herein described more particularly for heavy work it is not limited to such use, but admits of considerable modification and variation within the spirit and principle of the invention as defined in the appended claims, and, therefore, is not to be confined to the specific construction and arrangement shown.

I claim:

1. In a device of the class described, an annular outer frame, a chuck-ring rotatably mounted therein, said chuck-ring having clutch members thereon for engaging the object to be turned, an operating lever on said outer frame, and a power transmission gear between said operating lever and said chuck-ring.

2. In a device of the class described, an annular outer frame, a chuck-ring rotatably mounted therein, said chuck-ring having clutch members arranged thereon so as to grip the object to be rotated when the chuck-ring is rotated in one direction, and an annular series of gear teeth, a driving pinion on said outer frame, an intermediate pinion engaging said driving pinion and said annular series of gear teeth of said chuck-ring, and an operating lever for said driving pinion.

3. In a device of the class described, an annular outer frame, a chuck-ring rotatably mounted therein, said outer frame and said chuck-ring each comprising two separable half sections, said chuck-ring having oppositely disposed clutch-blocks arranged thereon so as to engage the object to be rotated when the chuck-ring is rotated in one direction, means for detachably connecting the respective sections of said outer frame and said chuck-ring, an operating lever on said outer frame, and a transmission gear between said lever and said chuck-ring, said transmission gear including a ratchet mechanism whereby said chuck-ring is rotated in one direction with respect to said outer frame.

4. In a device of the class described, an annular outer frame, a chuck-ring rotatably mounted therein, said outer frame and said chuck-ring each comprising two separable half sections, means for detachably connecting the respective sections of said outer frame and said chuck-ring, oppositely disposed clutch-blocks arranged on said chuck-ring so as to grip the object to be turned when the chuck-ring is rotated in one direction, an annular series of gear teeth on the periphery of said chuck-ring, a pinion on said outer frame in mesh with said gear teeth of the chuck-ring, rollers on said outer frame for supporting said chuck-ring in opposed relation to said pinion, a driving pinion on said outer frame in mesh with said first mentioned pinion, and an operating lever for actuating said driving pinion.

5. In a device of the class described, an annular outer frame, a chuck-ring rotatably mounted therein, said chuck-ring having peripheral gear teeth thereon, and annular ribs on its sides, anti-friction rollers on said outer frame affording side bearings for said chuck-ring, a pinion on said outer frame in mesh with the gear teeth of said chuck-ring, a driving pinion on said outer frame in mesh with said first mentioned pinion, an operating lever on said outer frame, and a ratchet mechanism between said operating lever and said driving pinion.

In testimony whereof, I have hereunto set my hand.

JOHN HELM.